No. 894,316. PATENTED JULY 28, 1908.
W. T. EDWARDS.
GRAIN DRILL.
APPLICATION FILED AUG. 29, 1907.
3 SHEETS—SHEET 1.
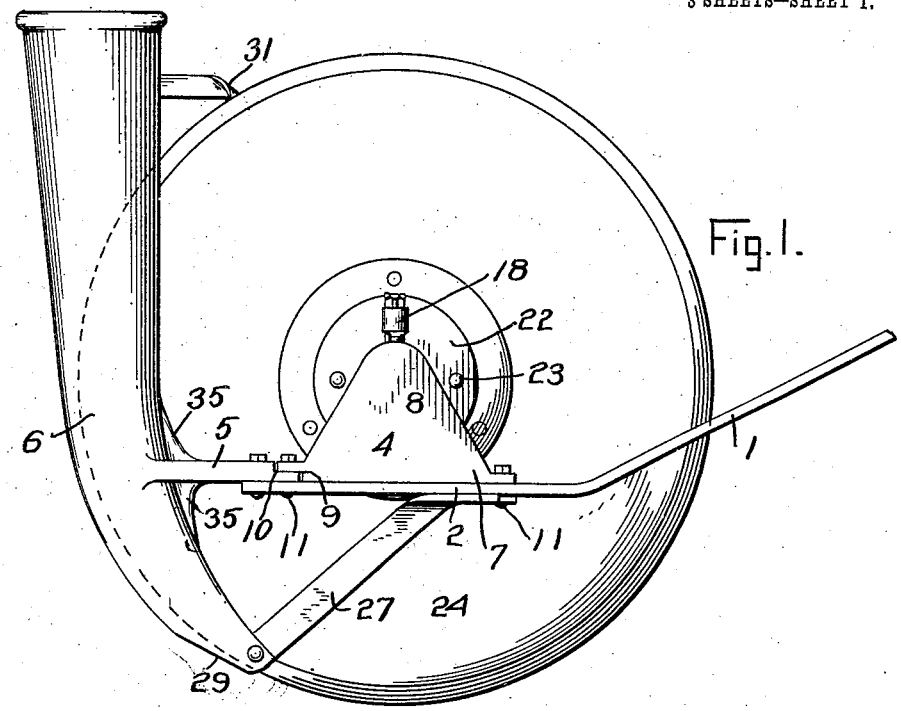
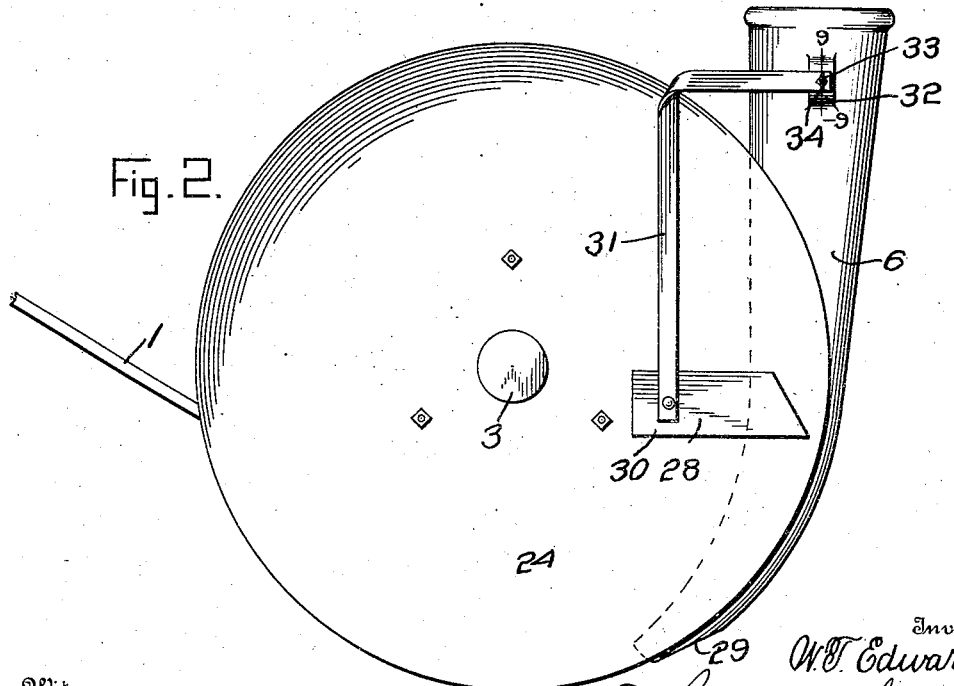
Witnesses
C. K. Reichenbach
F. C. McCartney
Inventor
W. T. Edwards
By Chandler & Chandler
Attorneys No. 894,316.
PATENTED JULY 28, 1908.
W. T. EDWARDS.
GRAIN DRILL.
APPLICATION FILED AUG. 29, 1907.
3 SHEETS—SHEET 2.
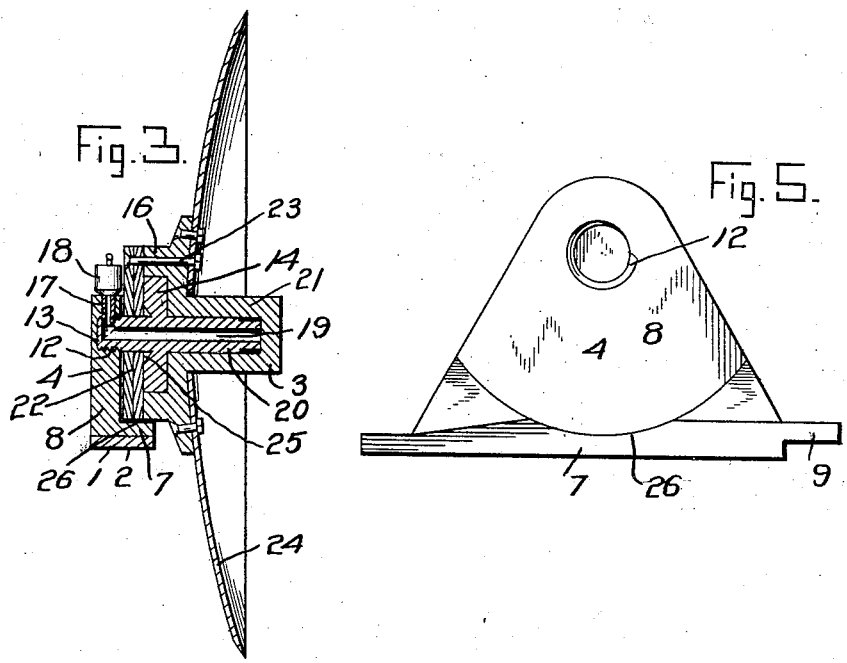
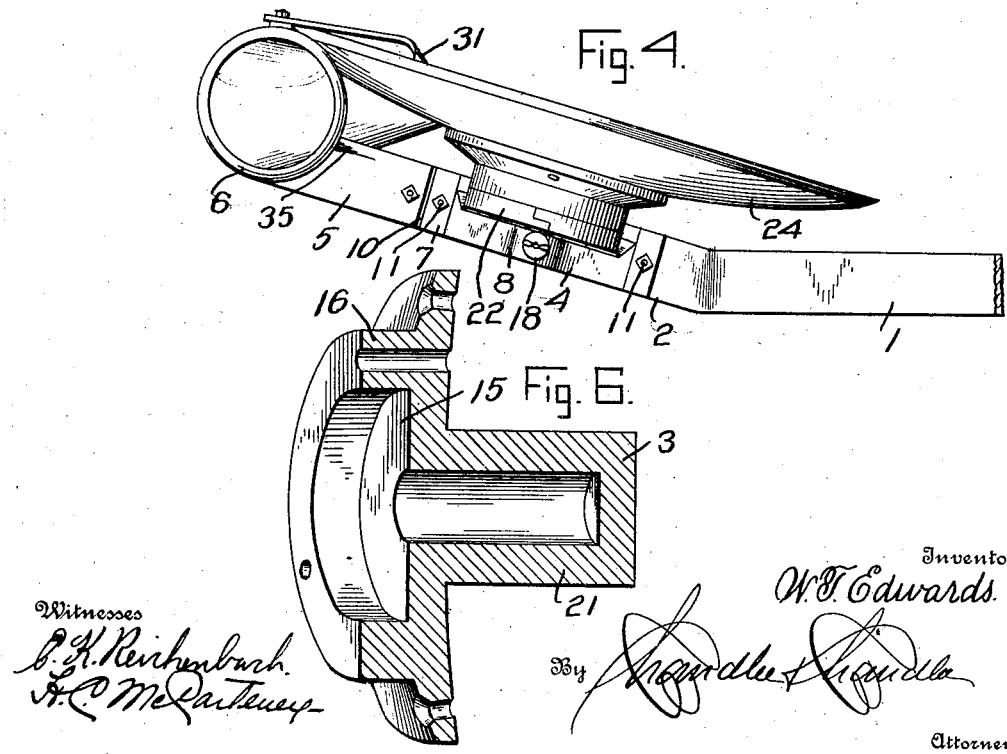
Witnesses
Inventor
W. T. Edwards.
By
Attorneys.

No. 894,316. PATENTED JULY 28, 1908.
W. T. EDWARDS.
GRAIN DRILL.
APPLICATION FILED AUG. 29, 1907.
3 SHEETS—SHEET 3.
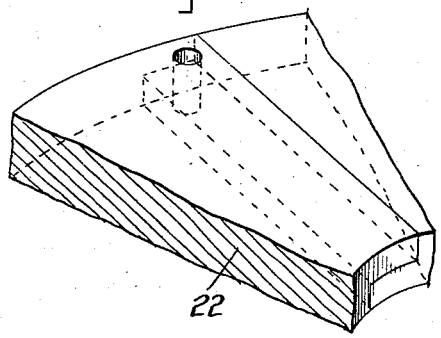
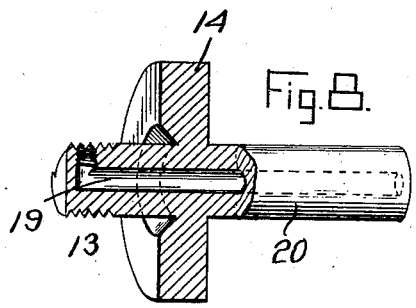
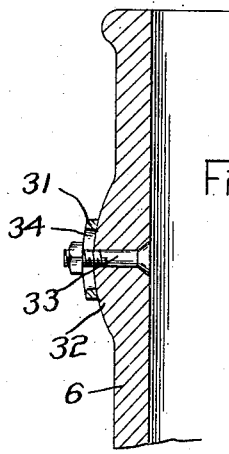
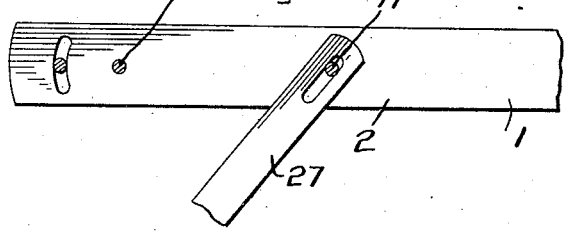
Witnesses
Inventor
W. T. Edwards
By
Attorneys.

UNITED STATES PATENT OFFICE.

WILLIAM T. EDWARDS, OF DUQUOIN, KANSAS.

GRAIN-DRILL.

No. 894,316.   Specification of Letters Patent.   Patented July 28, 1908.

Application filed August 29, 1907. Serial No. 390,657.

*To all whom it may concern:*

Be it known that I, WILLIAM T. EDWARDS, a citizen of the United States, residing at Duquoin, in the county of Harper, State of Kansas, have invented certain new and useful Improvements in Grain-Drills; and I do hereby declare the following to be a full, clear, and exact description of the invention, such as will enable others skilled in the art to which it appertains to make and use the same.

The present invention relates to improvements in grain-drills, and it aims to provide an exceedingly simple inexpensive, and efficient, device of that nature including a boot and a disk furrow-opener provided with a lubricant retaining bearing.

With the above and other ends in view the invention consists in the construction, combination, and arrangement of parts, all as hereinafter fully described, specifically claimed, and illustrated in the accompanying drawings, in which like parts are designated by corresponding reference numerals in the several views.

Of the said drawings, Figures 1 and 2 are views in elevation taken from opposite sides of a grain-drill constructed in accordance with the present invention, Fig. 3 is a vertical section through the bearing, Fig. 4 is a top plan view of the drill, Fig. 5 is an enlarged elevation of the outer bearing member, taken from the inner side thereof, Fig. 6 is a fragmental perspective view of the inner bearing member, Fig. 7 is a detail view of the split washer, Fig. 8 is a detail view, partly in section, of the spindle, Fig. 9 is a vertical section taken on the line 9—9 of Fig. 2. Fig. 10 is an inverted plan view of the support end of the drag bar showing the arcuate slot formed therein.

Referring more particularly to the drawings the numeral 1 designates a drag-bar whose lower end 2 is bent so as to lie in a horizontal plane to serve as a support for the inner and outer bearing members 3 and 4 and for the block 5 which is fastened to the boot 6.

The outer bearing member, which is illustrated in Fig. 5, comprises a base 7 and a vertical shoulder 8 formed on the upper face thereof adjacent the outer side edge, the base having a tenoned rear end 9 which engages with the adjacent tenoned end 10 of the block 5, said block and bearing member being held in place against the support 2 by bolts 11 which fit in openings formed through the support and through the opposite ends of the block and the base of said bearing. The shoulder 8 has formed in its inner face a threaded opening 12 adapted to receive the threaded outer end of a spindle 13 provided with an enlarged annular shoulder 14 which fits in an annular seat 15 formed by an annular wall 16 which projects laterally from the outer face of the inner bearing member 3, whose diameter is somewhat greater than that of said wall so that that portion of said member between its periphery and the base of the wall 16 may be regarded as a flange. The shoulder 8 is further provided at its upper end with a threaded opening 17 which communicates with the opening 12 and is adapted to receive the threaded stem of an oil-cup 18 having a compression cap of the usual type, the cup stem projecting a slight distance into an L-shaped oil-passage 19 formed in the spindle and extending through the stem portion 20 thereof, which stem fits in a hollow bearing sleeve 21 formed upon the bearing member 3, the end of said sleeve being closed, as shown in Fig. 6.

Interposed between the inner face of the shoulder 8 and the outer face of the shoulder 14 and wall 16 is a split washer 22 formed of a pair of semi-circular sections having interlocking tenoned edges provided with registering openings for the reception of the fastening bolts 23 which extend through similar openings formed in the rotatable furrow-opening disk 24, which disk is also provided with an axial opening through which the sleeve 21 extends, the flange portion of the bearing member upon which the sleeve is formed being likewise bolted to the disk, as shown. The outer face of the shoulder 14 is, moreover, provided with an annular groove for the reception of a second washer 25, which groove is formed adjacent the line of coincidence between the shoulder and spindle proper.

From the foregoing description, it will be apparent that upon forward movement of the drill, the disk 24 will rotate, with the sleeve 21, upon the stem portion of the spindle, the upper face of the outer bearing member 4, at the base of the shoulder 8, being cut away, or concaved, as indicated by the numeral 26, to permit such rotation.

The drill boot 6 above referred to, is provided with a pair of scrapers 27 and 28, which are disposed upon opposite sides of the disk and bear against its opposite faces, the former consisting of a beveled strap which is connected at its lower end to the toe of the boot adjacent the discharge opening 29 therein, and at its upper end to the under face of the support 12, being given a quarter twist at that point as shown. The scraper 28 consists of a blade 30 which is attached to the upper end of the boot by a twisted strap 31 whose upper end is bent so as to conform to the convex surface of a shoulder 32 formed on the boot, said shoulder having a bolt 33 which projects through an arcuate slot 34 formed in the strap end, thus permitting a slight adjustment of said scraper towards and from the face of the disk. A similar adjustment of the scraper 27 is also effected by lengthening the slot in the twisted upper end of said scraper at the point at which it is connected to the support end of the drag bar, the boot being likewise capable of a slight adjustment with respect to the support by similarly lengthening the slot at the rear end of the latter, as shown in Fig. 10.

The connection between the boot 6 and the block 5 is materially strengthened by the formation of flanges 35 upon opposite sides of the latter, the flanges being likewise secured to the shoe.

It will be apparent from the foregoing that both scrapers may be moved into and out of contact with the corresponding faces of the disk, and that the provision of the oil-cup and the formation of the lubricant channel permits a proper lubrication of the spindle and inner walls of the bearing sleeve.

The spindle 13 is provided adjacent its threaded outer end with a pair of oppositely disposed depressions or flattened portions to permit of a wrench being engaged therewith.

What is claimed, is,

1. The combination, in a grain-drill, of a bearing member provided with a shoulder having a threaded opening formed in its inner face, and an opening formed in its upper end and communicating with the first-mentioned opening; a spindle having a threaded end fitted in said threaded opening, and an L-shaped lubricant channel extending from end to end thereof and adapted to register with the opening in the upper end of said shoulder; an oil-cup having a stem fitted in the second opening and extending into said channel; a bearing member having a hollow sleeve adapted to receive said spindle; a washer interposed between said bearing members; and a rotary disk bolted to said last-mentioned bearing member and provided with an axial opening through which said sleeve extends.

2. The combination, in a grain-drill, of a bearing member provided with a shoulder having a threaded opening formed in its inner face, and an opening formed in its upper end and communicating with said first-mentioned opening; a spindle having a threaded end fitted in said threaded opening, and an L-shaped lubricant channel extending from end to end thereof and adapted to register with the opening in the upper end of said shoulder; an oil-cup having a stem fitted in the second opening and extending into said channel; an annular shoulder formed on said spindle adjacent the threaded end thereof; a second bearing member provided with a hollow sleeve adapted to receive the stem portion of said spindle, and with a laterally-projecting wall forming a seat for the reception of said annular shoulder; a washer interposed between said bearing members; and a rotary disk bolted to said second bearing member and provided with an axial opening through which said sleeve extends.

In testimony whereof, I affix my signature, in presence of two witnesses.

WILLIAM T. EDWARDS.

Witnesses:
 LEVI EDWARD,
 L. L. SEELEY.